(12) United States Patent
Baldwin

(10) Patent No.: US 8,882,628 B2
(45) Date of Patent: Nov. 11, 2014

(54) MULTIPLE SPEED TRANSMISSION

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 13/435,007

(22) Filed: Mar. 30, 2012

(65) Prior Publication Data
US 2013/0260946 A1    Oct. 3, 2013

(51) Int. Cl.
*F16H 3/62* (2006.01)

(52) U.S. Cl.
USPC .......................................... 475/276

(58) Field of Classification Search
CPC ....... F16H 3/62; F16H 1/46; F16H 2200/006; F16H 2200/2012; F16H 2200/2043; F16H 2200/2066
USPC ........................... 475/275–292, 296, 330, 903
See application file for complete search history.

(56) References Cited

U.S. PATENT DOCUMENTS

| | | | |
|---|---|---|---|
| 2,448,249 A | 8/1948 | Bonham | |
| 2,478,868 A | 8/1949 | Hasbany | |
| 2,478,869 A | 8/1949 | Hasbany | |
| 3,267,769 A * | 8/1966 | Tuck et al. ........................ | 475/68 |
| 3,398,606 A * | 8/1968 | Utter ............................... | 475/276 |
| 3,473,412 A | 10/1969 | Bookout | |
| 3,473,413 A | 10/1969 | Stockton | |
| 4,224,838 A | 9/1980 | Roushdy et al. | |
| 4,229,996 A | 10/1980 | Hildebrand | |
| 4,346,622 A | 8/1982 | Pierce | |
| 4,400,998 A | 8/1983 | Bookout et al. | |
| 5,429,557 A | 7/1995 | Beim | |
| 5,503,605 A | 4/1996 | Beim | |
| 5,919,111 A | 7/1999 | Park | |
| 5,924,951 A * | 7/1999 | Winzeler et al. ............... | 475/275 |
| 5,989,148 A * | 11/1999 | Park .............................. | 475/284 |
| 5,993,347 A | 11/1999 | Park | |
| 8,353,801 B2 * | 1/2013 | Hart et al. ...................... | 475/276 |
| 8,523,729 B2 * | 9/2013 | Hart et al. ...................... | 475/282 |
| 2008/0242492 A1 * | 10/2008 | Phillips et al. ................ | 475/276 |
| 2008/0261767 A1 * | 10/2008 | Phillips et al. ................ | 475/282 |
| 2009/0305837 A1 | 12/2009 | Hiraiwa | |
| 2010/0035718 A1 | 2/2010 | Saitoh | |
| 2010/0190601 A1 | 7/2010 | Phillips | |
| 2012/0065020 A1 * | 3/2012 | Mellet et al. .................. | 475/275 |
| 2012/0214634 A1 * | 8/2012 | Mellet et al. .................. | 475/149 |
| 2012/0295754 A1 * | 11/2012 | Hart et al. ..................... | 475/275 |

* cited by examiner

*Primary Examiner* — Robert A Siconolfi
*Assistant Examiner* — Huan Le
(74) *Attorney, Agent, or Firm* — James Dottavio; Brooks Kushman P.C.

(57) ABSTRACT

Four planetary gear sets, three rotating clutches, and two brakes can be arranged to produce eight forward speed ratios and a reverse speed ratio. The first and fourth gear sets can be substantially coplanar with each other, and the second and third gear sets can be substantially coplanar with each other. The lowest forward speed ratio could be suitable for use as a special purpose low range ratio, while the remaining seven forward ratios can provide adequate span for normal driving.

23 Claims, 5 Drawing Sheets

| Sun | Ring | Beta Ratio |
|---|---|---|
| 18 | 20 | 1.65 |
| 26 | 28 | 1.70 |
| 34 | 36 | 1.70 |
| 44 | 46 | 1.40 |

FIG. 2

|  | 52/62 | 54 | 56 | 58 | 60 | Ratio | Step |
|---|---|---|---|---|---|---|---|
| Reverse | X | X | X |  |  | -4.35 | 68% |
| 1st | X | X |  | X |  | 6.36 |  |
| 2nd | X | X |  |  | X | 4.16 | 1.53 |
| 3rd |  | X |  | X | X | 2.40 | 1.73 |
| 4th |  | X | X |  | X | 1.78 | 1.35 |
| 5th |  | X | X | X |  | 1.36 | 1.30 |
| 6th |  |  | X | X | X | 1.00 | 1.36 |
| 7th | X |  | X | X |  | 0.82 | 1.22 |
| 8th | X |  | X |  | X | 0.65 | 1.26 |

FIG. 3

| Sun | Ring | Beta Ratio |
|---|---|---|
| 64 | 66 | 2.20 |
| 26 | 28 | 1.75 |
| 34 | 36 | 1.70 |
| 44 | 46 | 1.40 |

FIG. 5

|  | 52 | 54 | 56 | 58 | 60 | Ratio | Step |
|---|---|---|---|---|---|---|---|
| Reverse | X | X | X |  |  | -3.29 | 62% |
| 1st | X | X |  | X |  | 5.28 |  |
| 2nd | X | X |  |  | X | 3.51 | 1.51 |
| 3rd |  | X |  | X | X | 2.40 | 1.46 |
| 4th |  | X | X |  | X | 1.86 | 1.29 |
| 5th |  | X | X | X |  | 1.39 | 1.34 |
| 6th |  |  | X | X | X | 1.00 | 1.39 |
| 7th | X |  | X | X |  | 0.83 | 1.21 |
| 8th | X |  | X |  | X | 0.66 | 1.24 |

FIG. 6

MULTIPLE SPEED TRANSMISSION

TECHNICAL FIELD

This disclosure relates to the field of automatic transmissions for motor vehicles. More particularly, the disclosure pertains to an arrangement of planetary gear sets, clutches, brakes, and the interconnections among them in a power transmission.

BACKGROUND

Automobile manufacturers are under increasing pressure to improve the fuel efficiency of vehicles. One means of improving fuel efficiency is utilizing transmissions with more speed ratios, thereby operating the engine closer to its most efficient speed at various vehicle speeds. Generally, increasing the number of available speed ratios requires increasing the number of gear sets and clutches and consequently making the transmission physically longer. However, automobile manufacturers are also under pressure to reduce the width of the engine compartment. For transverse mounted powertrains, this severely constrains the ability to use a longer transmission.

Four wheel drive vehicles based on longitudinal powertrains utilize a transfer case behind the transmission. Many transfer cases include a driver selected low range mode which provides additional speed reduction. This low range mode is useful when additional torque is needed or when improved vehicle speed control is needed. Vehicles with transverse powertrains do not use a transfer case and therefore have not offered drivers a low range mode.

SUMMARY

Certain transmission systems disclosed herein comprise arrangements of planetary gear sets and couplers interconnected to produce up to eight forward speed ratios and at least one reverse speed ratio. Some embodiments are particularly suited to applications that require reduced axial length because two planetary gear sets can be located in a single axial plane. In some embodiments, the sun gears of the outer planetary gear sets can be directly fixed to the ring gears of the inner planetary gear sets. The overall diameter of two gear sets located in a single plane might be excessive if the tooth number ratio of the outer gear set is too large. However, in some disclosed embodiments, a small tooth number ratio can be selected for the outer gear sets while retaining favorable spacing among the speed ratios. The eight forward speed ratios can be widely spaced. As a result, the 1st forward ratio may be used in a special purpose low range mode similar to the low range mode achieved through a transfer case.

BRIEF DESCRIPTION OF THE DRAWINGS

FIG. 2 is a table showing suggested ratios of tooth numbers for the embodiment of FIG. 1.

FIG. 3 is a table showing the clutch application chart and resulting ratios when the embodiment of FIG. 1 has the ratios of tooth numbers shown in FIG. 2.

FIG. 5 is a table showing suggested ratios of tooth numbers for the embodiment of FIG. 4.

FIG. 6 is a table showing the clutch application chart and resulting ratios when the embodiment of FIG. 4 has the ratios of tooth numbers shown in FIG. 5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Two components are fixed to one another when they are constrained to have substantially identical rotational speeds in all operating conditions. In contrast, two components are releasably coupled by a control element when they are constrained to rotate at substantially the same speed whenever the control element is fully engaged and they have distinct speeds in at least some other operating condition. A component that is releasably coupled to a non-rotating component, such as a transmission case, is said to be releasably held against rotation and the control element may be called a brake. An element has a positive speed when it rotates in one direction and a negative speed when it rotates in the opposite direction.

Figure 1:
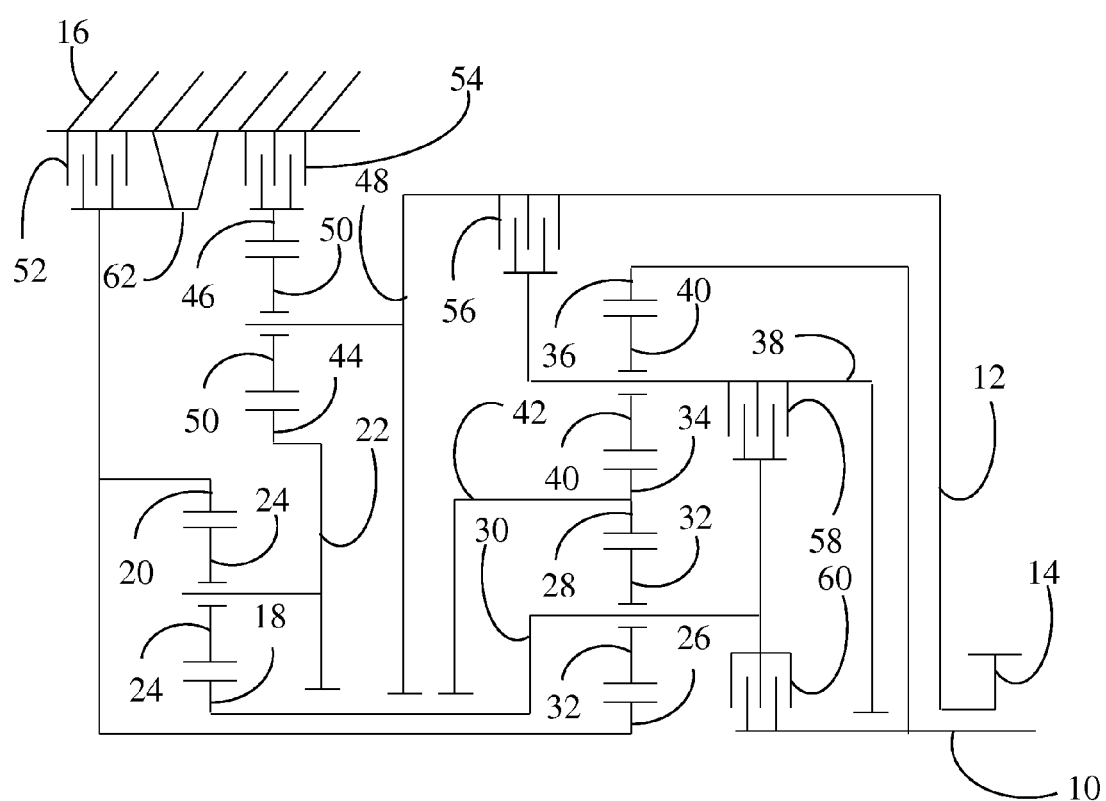
FIG. 1 is a schematic illustration of a first embodiment of the gearing arrangement.

FIG. 1 illustrates a first embodiment of a transmission according to the present invention. Input 10 is driven by the vehicle engine, preferably via a hydrodynamic torque converter with a lockup clutch (not shown). Output 12 drives the vehicle wheels via output gear 14 and a differential assembly (not shown). The transmission case 16 is mounted to vehicle structure and does not rotate with respect to the vehicle.

A first simple planetary gear set includes sun gear 18, ring gear 20, and carrier 22. A set of planet gears 24 are supported on carrier 22 and mesh with both sun gear 18 and ring gear 20. Similarly, a second simple planetary gear set includes sun gear 26, ring gear 28, carrier 30, and planet gears 32. Sun gear 26 is fixed to ring gear 20 and carrier 30 is fixed to sun gear 18. The third simple planetary gear set, including sun gear 34, ring gear 36, carrier 38, and planet gears 40, is coplanar with and radially outside the second gear set. Ring gear 28 and sun gear 34 are combined into common member 42. Ring gear 36 is fixed to the input 10. Finally, the fourth simple planetary gear set, including sun gear 44, ring gear 46, carrier 48, and planet gears 50, is coplanar with and radially outside the first gear set. Sun gear 44 is fixed to carrier 22 while carrier 48 is fixed to output 12. The ratio of the number of teeth on the ring gear to the number of teeth on the sun gear is called the beta ratio. Suggested beta ratios for these gear sets are shown in FIG. 2.

Brakes 52 and 54 and clutches 56, 58, and 60 are, in some examples, hydraulically actuated multi-plate friction clutches. When a control system supplies pressurized fluid to such a clutch, a piston forces the plates together such that the releasably coupled elements are forced to rotate at the same speed. When the pressure is released, a spring forces the plates apart such that the releasably coupled elements can rotate at different speeds with minimal drag torque transmitted. Brake 52 releasably couples the combination of ring gear 20 and sun gear 26 to transmission case 16. Similarly, brake 54 releasably couples ring gear 46 to transmission case 16. Clutch 56 releasably couples carrier 48 to the output 12. Clutch 58 releasably couples carrier 38 to the combination of sun gear 18 and carrier 30. Finally, clutch 60 releasably couples the combination of sun gear 18 and carrier 30 to the input 10.

FIG. 3 shows which clutches are engaged to select each of the available eight forward and one reverse speed ratios. Shifts between adjacent ratios are accomplished by the coordinated release of one clutch and engagement of another clutch, holding two clutches in the engaged state. FIG. 3 also shows the resulting speed ratio when the tooth counts of the gearsets have the ratios shown in FIG. 2. In most driving conditions, the 1st forward ratio may be skipped and the 2nd forward ratio used to start from a stationary condition. In situations that require more wheel torque or more precise speed control, the driver may select a low range operating mode. In this mode, the vehicle would utilize all eight forward ratios.

The transmission can optionally include one way clutch 62 which passively holds the combination of ring gear 20 and sun gear 26 against rotation in one direction while permitting rotation in the opposite direction. If one way clutch 62 is present, then it is not necessary to engage brake 52 in the 1st and 2nd forward ratios. This simplifies the shift from the 2nd to the 3rd ratio because the control system does not need to actively control the release of a clutch. As clutch 58 is engaged, one way clutch 62 automatically over-runs.

Figure 4:
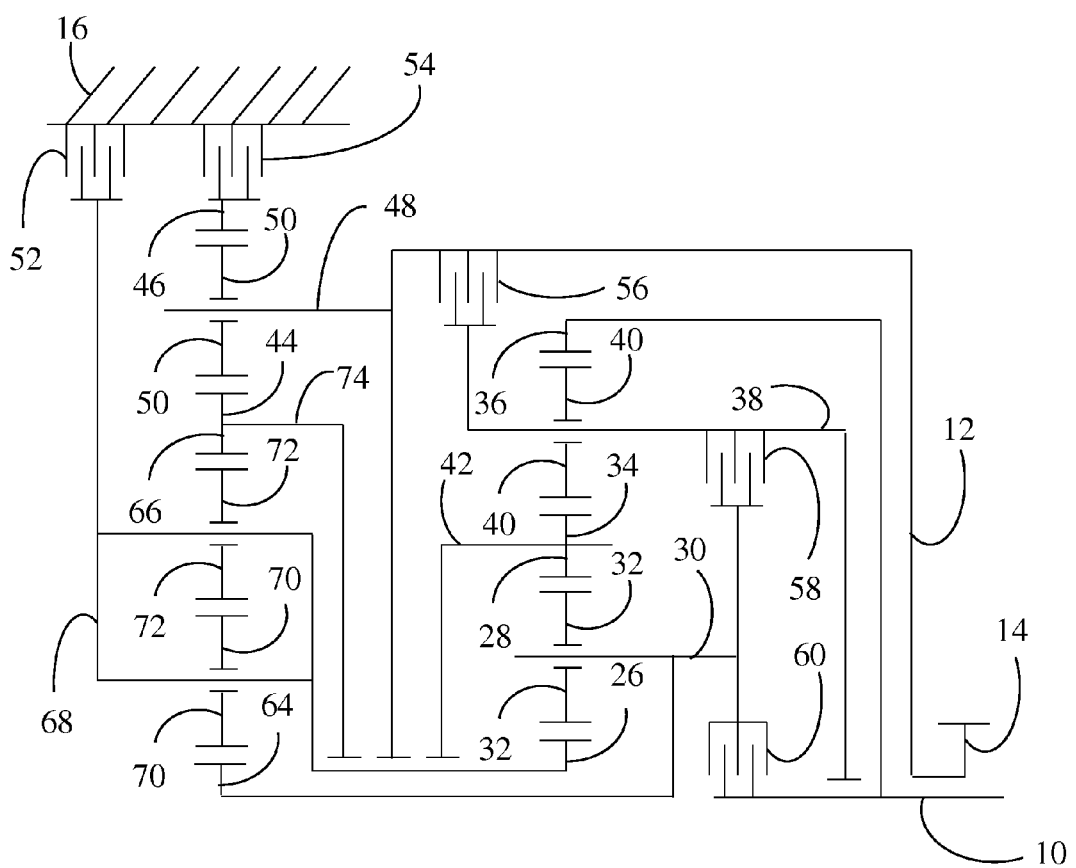
FIG. 4 is a schematic illustration of a second embodiment of the gearing arrangement.

FIG. 4 illustrates a second embodiment of a transmission according to the present invention. Components that are common to both the first and second embodiment are labeled with the same reference number on FIG. 1 and FIG. 4.

A double pinion planetary gear set includes sun gear 64, ring gear 66, and carrier 68. A set of inner planet gears 70 are supported on carrier 68 and mesh with sun gear 64. A set of outer planet gears 72 are supported on carrier 68. Each outer planet gear meshes with one of the inner planet gears and with ring gear 66. A simple planetary gear set includes sun gear 26, ring gear 28, carrier 30, and planet gears 32. Sun gear 26 is fixed to carrier 68 and carrier 30 is fixed to sun gear 64. Another simple planetary gear set, including sun gear 34, ring gear 36, carrier 38, and planet gears 40, is coplanar with and radially outside the second gear set. Ring gear 28 and sun gear 34 are combined into common member 42. Ring gear 36 is fixed to the input 10. Finally, another simple planetary gear set, including sun gear 44, ring gear 46, carrier 48, and planet gears 50, is coplanar with and radially outside the double pinion planetary gear set. Ring gear 66 and sun gear 44 are combined into common member 74. Carrier 48 is fixed to output 12. Suggested beta ratios for these gear sets are shown in FIG. 5.

Brake 52 links the combination of carrier 68 and sun gear 26 to transmission case 16. Similarly, brake 54 links ring gear 46 to transmission case 16. Clutch 56 links carrier 48 to the output 12. Clutch 58 links carrier 38 to the combination of sun gear 64 and carrier 30. Finally, clutch 60 links the combination of sun gear 64 and carrier 30 to the input 10. FIG. 6 shows which clutches are engaged to select each of the available ratios and the resulting speed ratio when the tooth counts of the gear sets have the ratios shown in FIG. 5.

Figure 7:
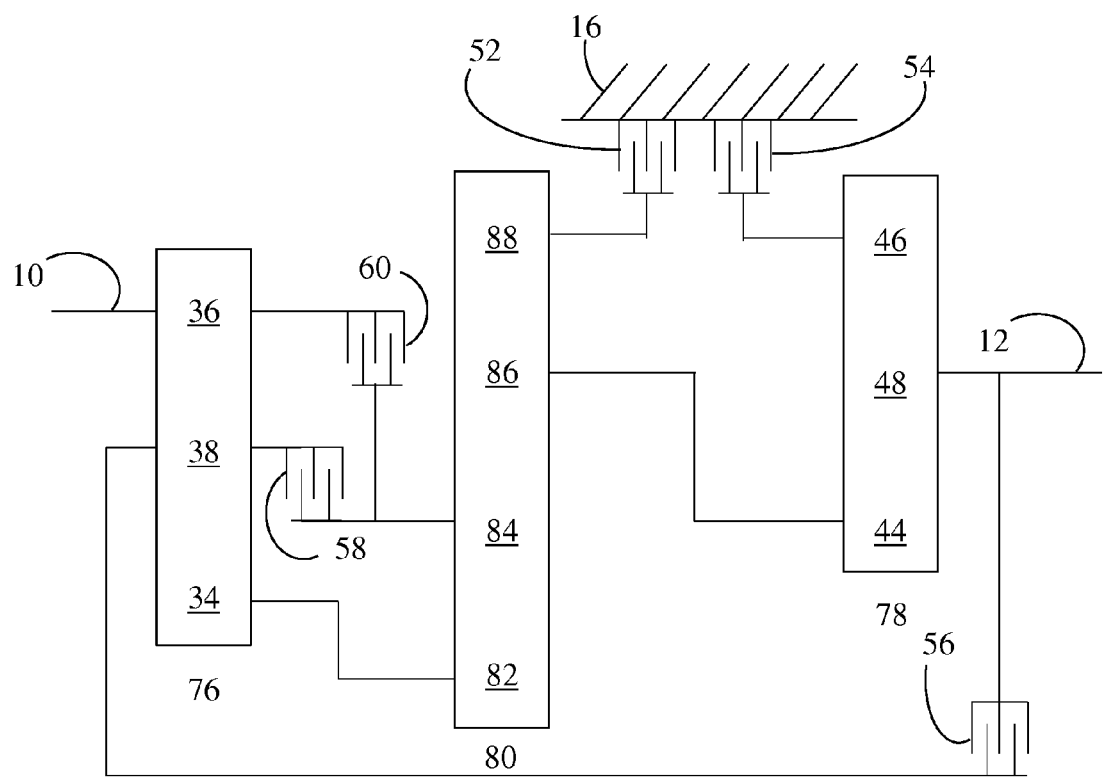
FIG. 7 is a lever diagram for the gearing arrangement.

FIG. 7 illustrates a lever diagram. Each lever corresponds to three or more elements that rotate about a common axis and are constrained to rotate with speeds that are linearly related. In other words, the speed of any element of the lever in any operating condition is the weighted average of the speeds of any two other elements of the lever in the same operating condition. Components which are constrained to have the same speed as each other in all operating conditions, as measured relative to the common axis, are considered a single element. For example, a carrier and a corresponding set of planet gears form a single element.

Every lever has two elements designated as the outer elements. In any operating condition, one outer element will have the slowest speed and the other outer element will have the fastest speed. These roles can be reversed in other operating conditions. The remaining elements, designated inner elements, have intermediate speeds in each operating condition. In a lever diagram, outer elements correspond to the endpoints of a lever, while the inner elements correspond to points along the lever.

A simple planetary gear set corresponds to a three node lever with the sun gear as one outer element, the ring gear as the other outer element, and the carrier as an inner element. A double pinion planetary gear set, on the other hands, corresponds to a three node lever with the sun gear and carrier as outer elements and the ring gear as the inner element. Other devices can be represented as levers in a lever diagram. Lever 76 represents the third gear set in FIG. 1 and in FIG. 4. Sun gear 34 and ring gear 36 are outer elements and carrier 38 is an inner element. Similarly, lever 78 represents the fourth gear set in FIG. 1 and in FIG. 4. Sun gear 44 and ring gear 46 are outer elements and carrier 48 is an inner element.

A four node lever can be created from two three node levers by fixing two of the elements of the first three node lever to two corresponding elements of the second three node lever. For example, four node lever 80 represents the first two gear sets of FIG. 1. Outer element 82 corresponds to ring gear 28. Inner element 84 corresponds to the combination of sun gear 18 and carrier 30. Inner element 86 corresponds to carrier 22. Finally, outer element 88 corresponds to the combination of ring gear 20 and sun gear 26. Four node lever also represents two gear sets of FIG. 4. Outer element 82 corresponds to ring gear 28. Inner element 84 corresponds to the combination of sun gear 26 and carrier 30. Inner element 86 corresponds to ring gear 66. Finally, outer element 88 corresponds to the combination of carrier 68 and sun gear 26.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   five control elements; and
   first, second, third and fourth planetary gear sets, the control elements and gear sets arranged such that the five control elements are each selectively engageable in combinations of three to produce eight forward speed ratios between an input and an output, the third gear set is radially outside of the second gear set, and the fourth gear set is radially outside of the first gear set.

2. The transmission of claim 1 wherein each gear set has a beta ratio, and wherein the beta ratios of the third and fourth gear sets are less than 1.8.

3. The transmission of claim 1 wherein
   the third gear set and the second gear set share a first common member;
   the first common member is a ring gear of the second gear set; and
   the first common member is a sun gear of the third gear set.

4. The transmission of claim 3 wherein
   the fourth gear set and the first gear set share a second common member;

the second common member is a ring gear of the first gear set; and the second common member is a sun gear of the fourth gear set.

5. A vehicle comprising:
an input configured to be driven by an internal combustion engine;
an output configured to drive a plurality of wheels; and
a transmission including a first sun gear, a first ring gear, a first carrier, a second sun gear fixed to one of the first ring gear or the first carrier, a second ring gear, a second carrier fixed to the first sun gear, a third sun gear fixed to the second ring gear, a third ring gear fixed to the input, a third carrier, a fourth sun gear fixed to one of the first ring gear or the first carrier, a fourth ring gear, and a fourth carrier fixed to the output.

6. The vehicle of claim 5 further comprising
a range selector configured to allow a driver to select two different forward driving modes; and
a controller configured to utilize a lowest forward speed ratio when the driver selects a first forward driving mode and configured to not utilize the lowest forward speed ratio when the driver selects a second forward driving mode.

7. The vehicle of claim 5 further comprising:
a first brake releasably holding the second sun gear against rotation;
a second brake releasably holding the fourth ring gear against rotation;
a first clutch releasably coupling the third carrier to the output;
a second clutch releasably coupling the second carrier to the input; and
a third clutch releasably coupling the second carrier to the third carrier.

8. The vehicle of claim 7 wherein the third sun gear is substantially coplanar with the second ring gear.

9. The vehicle of claim 8 wherein the fourth sun gear is substantially coplanar with the first ring gear.

10. A transmission comprising:
an input;
a first gear set having three elements with linearly related speeds, the third element of the first gear set fixed to the input;
a second gear set having four elements with linearly related speeds, the first element of the second gear set fixed to the first element of the first gear set;
a third gear set having three elements with linearly related speeds, the first element of the third gear set fixed to the third element of the second gear set;
an output fixed to the second element of the third gear set;
a first brake releasably holding the fourth element of the second gear set against rotation;
a second brake releasably holding the third element of the third gear set against rotation;
a first clutch releasably coupling the second element of the first gear set to the output;
a second clutch releasably coupling the second element of the second gear set to the input; and
a third clutch releasably coupling the second element of the first gear set to the second element of the second gear set.

11. The transmission of claim 10 further comprising a one way clutch holding the fourth element of the second gear set against rotation in one direction while allowing rotation in the opposite direction.

12. The transmission of claim 10 further comprising a controller implementing a first forward driving mode wherein a lowest forward speed ratio is not utilized and implementing a second forward driving mode wherein the lowest forward speed ratio is utilized.

13. The transmission of claim 10 wherein
the first, second, and third elements of the first gear set have first, second, and third rotational speeds respectively, the second rotational speed constrained to be between the first rotational speed and the third rotational speed;
the second, third, and fourth elements of the second gear set have fourth, fifth, and sixth rotational speeds respectively, the fourth rotational speed constrained to be between the first rotational speed and the sixth rotational speed, the fifth rotational speed constrained to be between the fourth rotational speed and the sixth rotational speed; and
the second and third elements of the third gear set have seventh and eighth rotational speeds respectively, the seventh rotational speed constrained to be between the fifth rotational speed and the eighth rotational speed.

14. The transmission of claim 13 wherein the second gear set comprises
a first sun gear;
a first ring gear;
a first carrier;
a first set of planet gears supported for rotation with respect to the first carrier and in continuous meshing engagement with the first sun gear and first ring gear;
a second sun gear fixed to the first ring gear;
a second ring gear;
a second carrier fixed to the first sun gear; and
a second set of planet gears supported for rotation with respect to the second carrier and in continuous meshing engagement with the second sun gear and second ring gear.

15. The transmission of claim 14 wherein the first gear set comprises
a third sun gear fixed to the second ring gear;
a third ring gear fixed to the input;
a third carrier; and
a third set of planet gears supported for rotation with respect to the third carrier and in continuous meshing engagement with the third sun gear and third ring gear.

16. The transmission of claim 14 wherein the first gear set comprises
a fourth sun gear fixed to the first carrier;
a fourth ring gear;
a fourth carrier fixed to the output; and
a fourth set of planet gears supported for rotation with respect to the fourth carrier and in continuous meshing engagement with the fourth sun gear and fourth ring gear.

17. The transmission of claim 13 wherein the second gear set comprises
a first sun gear;
a first ring gear;
a first carrier;
a first set of planet gears supported for rotation with respect to the first carrier and in continuous meshing engagement with the first sun gear;
a fifth set of planet gears supported for rotation with respect to the first carrier and in continuous meshing engagement with the first set of planet gears and the first ring gear;
a second sun gear fixed to the first carrier;
a second ring gear;
a second carrier fixed to the first sun gear; and a second set of planet gears supported for rotation about the second carrier and in continuous meshing engagement with the second sun gear and second ring gear.

18. The transmission of claim 17 wherein the first gear set comprises
   a third sun gear fixed to the second ring gear;
   a third ring gear fixed to the input;
   a third carrier; and
   a third set of planet gears supported for rotation with respect to the third carrier and in continuous meshing engagement with the third sun gear and third ring gear.

19. The transmission of claim 17 wherein the first gear set comprises
   a fourth sun gear fixed to the first ring gear;
   a fourth ring gear;
   a fourth carrier fixed to the output; and
   a fourth set of planet gears supported for rotation with respect to the fourth carrier and in continuous meshing engagement with the fourth sun gear and fourth ring gear.

20. A transmission comprising:
   an input;
   an output;
   a first planetary gear set having first sun gear, a first ring gear, and a first carrier;
   a second planetary gear set having a second sun gear fixed to one of the first ring gear and the first carrier, a second ring gear, and a second carrier fixed to the first sun gear;
   a third planetary gear set having a third sun gear fixed to the second ring gear, a third ring gear fixed to the input, and a third carrier; and
   a fourth planetary gear set having a fourth sun gear fixed to one of the first ring gear and the first carrier, a fourth ring gear, and a fourth carrier fixed to the output.

21. The transmission of claim 20 further comprising:
   a first brake releasably holding the second sun gear against rotation;
   a second brake releasably holding the fourth ring gear against rotation;
   a first clutch releasably coupling the third carrier to the output;
   a second clutch releasably coupling the second carrier to the input; and
   a third clutch releasably coupling the second carrier to the third carrier.

22. The transmission of claim 21 wherein the third sun gear is substantially coplanar with the second ring gear.

23. The transmission of claim 22 wherein the fourth sun gear is substantially coplanar with the first ring gear.

* * * * *